US007677764B2

(12) United States Patent
Lin

(10) Patent No.: US 7,677,764 B2
(45) Date of Patent: Mar. 16, 2010

(54) ILLUMINATING APPARATUS

(75) Inventor: Tsung-Yu Lin, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/327,630

(22) Filed: Dec. 3, 2008

(65) Prior Publication Data

US 2009/0303710 A1 Dec. 10, 2009

(30) Foreign Application Priority Data

Jun. 4, 2008 (CN) ........................ 2008 1 0301961

(51) Int. Cl.
*B60Q 1/14* (2006.01)

(52) U.S. Cl. .................. 362/283; 362/217.05; 362/282; 362/322; 362/325

(58) Field of Classification Search ............ 362/217.05, 362/217.08, 217.09, 260, 282, 283, 322, 362/325
See application file for complete search history.

(56) References Cited

U.S. PATENT DOCUMENTS

| | | | | |
|---|---|---|---|---|
| 6,244,729 | B1 * | 6/2001 | Waldmann | 362/260 |
| 6,382,817 | B1 * | 5/2002 | Chelf | 362/322 |
| 2006/0126325 | A1 * | 6/2006 | Lefebvre et al. | 362/217.05 |

* cited by examiner

*Primary Examiner*—Stephen F Husar
(74) *Attorney, Agent, or Firm*—Clifford O. Chi

(57) ABSTRACT

An exemplary illuminating apparatus comprises a light source holder, a linear light source and two elongated reflecting plates. The linear light source is mounted on the light source holder. The elongated reflecting plates are mounted on opposite sides of the light source holder. Each of the elongated reflecting plates is rotatable about a rotation axis relative to the light source holder.

20 Claims, 3 Drawing Sheets

ILLUMINATING APPARATUS

BACKGROUND

1. Technical Field

The present disclosure relates to an illuminating apparatus, and particularly, to an illuminating apparatus having an adjustable illumination range.

2. Description of Related Art

Currently, fluorescent lamps are widely used as a light source to obtain natural light in a wide variety of illuminating apparatuses, for example, indoor, outdoor and corridor illuminations.

To improve a light utilizing efficiency, fluorescent lamps usually have a lampshade for reflecting light back to a side that is need to be irradiated. Although a number of lampshades having different shapes are developed to improve a light reflecting efficiency; however, once the lampshades are made, they can't be modified to change light reflecting angles. In some practical illuminating applications, an area need to be irradiated may change together with time or other conditions. It is a waste of energy to irradiate areas that are not need for illumination.

For the foregoing reasons, there is a need in the art for an illuminating apparatus to overcome the above-described shortcomings.

SUMMARY

An exemplary illuminating apparatus comprises a light source holder, a linear light source and two elongated reflecting plates. The linear light source is mounted on the light source holder. The elongated reflecting plates are mounted on opposite sides of the light source holder. Each of the elongated reflecting plates is rotatable about a rotation axis relative to the light source holder.

This and other features and advantages of the present invention as well as the preferred embodiments thereof and an illuminating apparatus in accordance with the invention will become apparent from the following detailed description and the descriptions of the drawings.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION OF THE EMBODIMENTS

Reference will now be made to the drawings to describe described an exemplary embodiment of the illuminating apparatus in detail.

Figure 1:
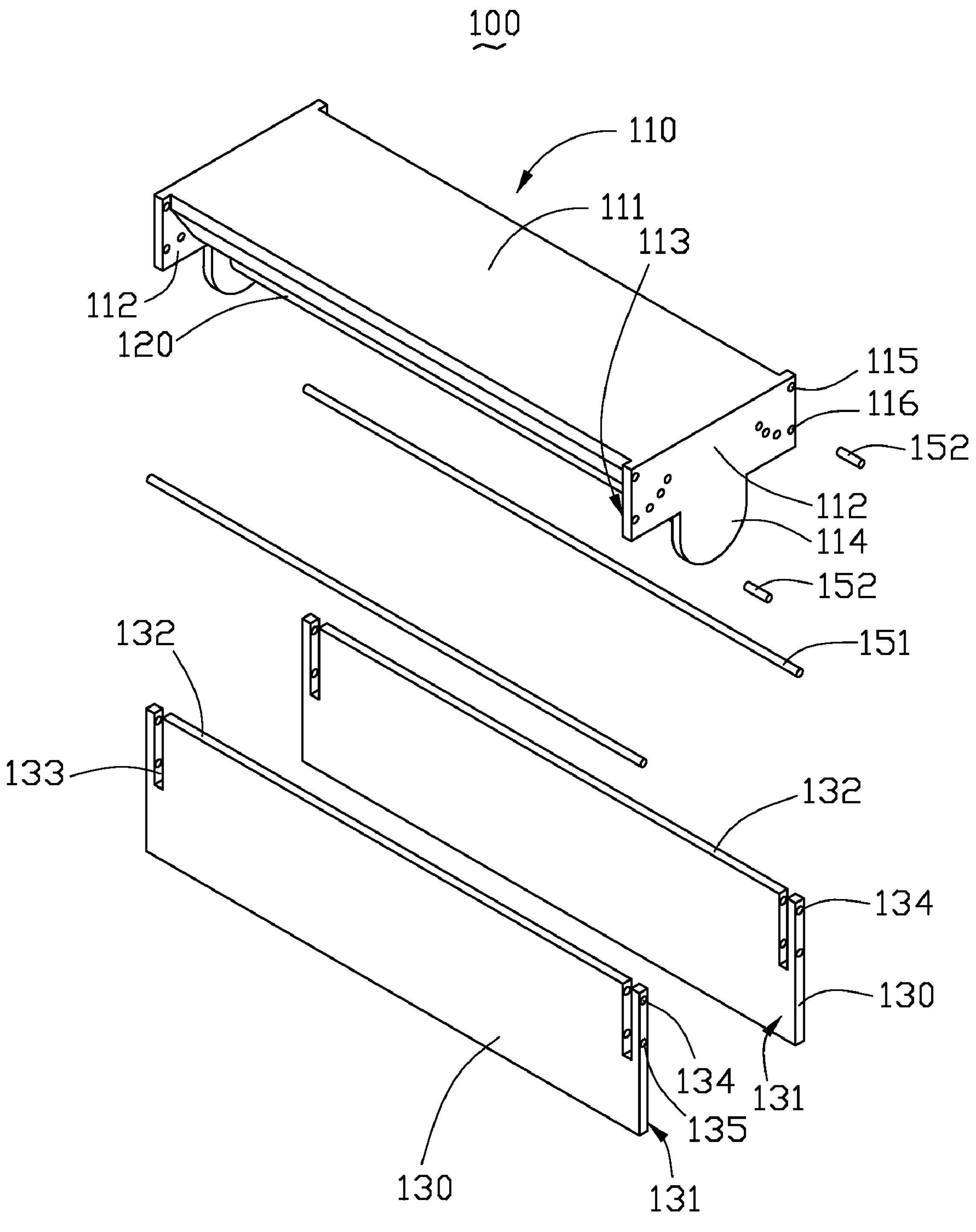
FIG. 1 is a schematic, exploded view of an illuminating apparatus according to an exemplary embodiment.
Figure 2:
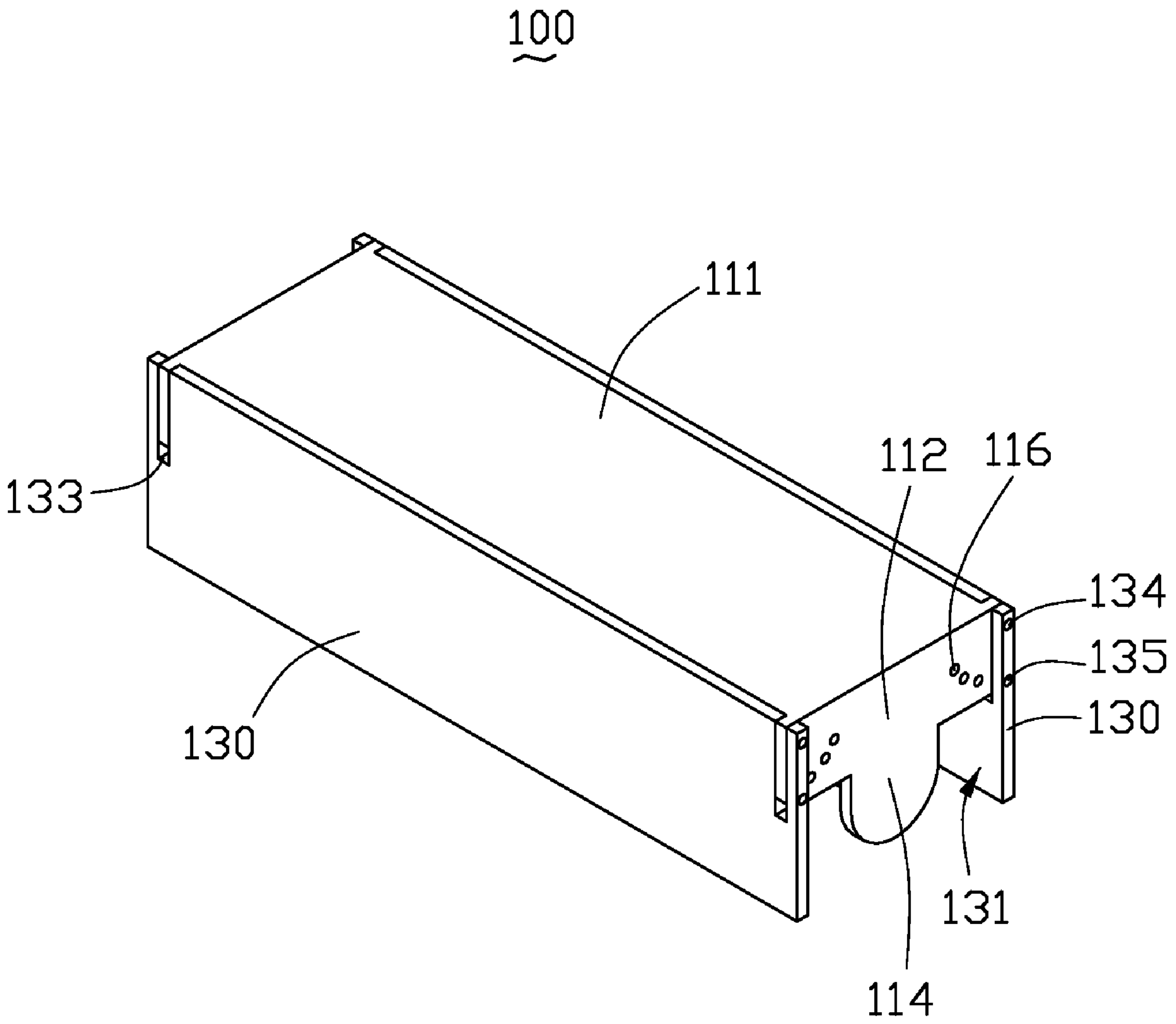
FIG. 2 is an assembled view of the illuminating apparatus of FIG. 1.

Referring to FIG. 1 and FIG. 2, an illuminating apparatus 100 includes a light source holder 110, a linear light source 120 and two elongated reflecting plates 130.

The light source holder 110 is configured for holding the linear light source 120 and the elongated reflecting plates 130, and includes a base 111 and two opposite end plates 112 extending from two opposite ends of the base 111. In this description, unless the context indicates otherwise, the configuration of only one of the end plates 112 is described.

In this embodiment, each of the end plates 112 has an inner sidewall 113. Two pivot holes 115 are defined in two ends of each of the end plates 112, respectively. Each of the pivot holes 115 is adjacent to a corresponding long side of the base 111. A number of through holes 116 are defined in the end plates 112. Each of the end plates 112 has a lug portion 114. The pivot holes 115 and through holes 116 pass through a corresponding end plate 112 parallel to a lengthwise direction of the linear light source 120. Each of the end plates 112 is perpendicular to the base 111 and the lengthwise direction of the linear light source 120. The through holes 116 are arranged in two groups at opposite ends of a corresponding elongated reflecting plate 130 in the vicinity of the pivot holes 115, respectively. In each group the through holes 116 are distributed along an arc of an imaginary circle around a rotation axis of a corresponding elongated reflecting plate 130. Each through hole 116 is capable of selectively receiving a fixing member therein. For example, the fixing member can be a pin 152. When two pins 152 are inserted into selected through holes 116 of the two ends of the end plate 112, the pins 152 protrude from the inner sidewall 113 of the end plate 112 thereby holding the elongated reflecting plates 130 at desired predetermined attitudes of rotation. The size, amount and location of the through holes 116 may vary according to the size of the fixing members and the reflecting needs of the elongated reflecting plates 130, such as light transmission direction or illuminating area.

The linear light source 120 includes a plurality of light emitting diodes (LEDs) aligned along a line. The linear light source 120 can optionally be a homochromatic or multi-color LED array. The linear light source 120 is fixed to the inner sidewall 113 of two end plates 112, and the lengthwise direction of the linear light source 120 is parallel to that of the base 111. Two ends of the linear light source 120 are respectively secured onto lug portions 114.

The elongated reflecting plates 130 are mounted on opposite sides of the light source holder 110. In the illustrated embodiment, the base 111 of the light source holder 110 is substantially rectangular, the end plates 112 are positioned at two opposite sides of the base 111, and the elongated reflecting plates 130 are mounted at another two opposite sides of the base 111. Each of the elongated reflecting plates 130 is rotatable about the rotation axis relative to the light source holder 110, for reflecting and condensing light emitting from the linear light source 120. The elongated reflecting plates 130 and the light source holder 110 cooperatively define a receiving space for receiving the linear light source 120 therein. Rotatable mounting means of the elongated reflecting plates 130 on the light source holder 110 can be selected from the previous arts based on practical need.

In the present embodiment, each of the elongated reflecting plates 130 is mounted on the two end plates 112 of the light source holder 110 by a pivot 151. The pivot 151 passes through a corresponding pivot hole 115 of each end plate 112. A lengthwise direction of the pivot 151 is parallel to that of the linear light source 120, thereby enabling the elongated reflecting plate 130 to be rotatable about the rotation axis parallel to the lengthwise direction of the linear light source 120.

Each of the elongated reflecting plates 130 has a peripheral surface 131, a lateral surface 132 adjoining the peripheral surface 131, a number of slits 133 and a number of first and second fixing holes 134, 135 defined parallel to the peripheral surface 131.

In the illustrated embodiment, two slits 133 are defined at opposite ends of each elongated reflecting plate 130. Each slit 113 extends through the elongated reflecting plate 130 along a direction perpendicular to the lengthwise direction of the linear light source 120, and is exposed at the lateral surface 132. The width of each slit 133 along a lengthwise direction of the base 111 is substantially greater than that of each end plate 112, for providing a space to accommodate the corresponding end plate 112 therein.

The first and second fixing holes 134, 135 extend through the elongated reflecting plates 130 along a direction parallel to the lengthwise direction of the linear light source 120. Each of the pivots 151 is inserted in the first fixing holes 134 of one reflecting plate 130, and two opposite ends of the pivot 151 are pivotably mounted on the two end plates 112 of the light source holder 110. Each of the first fixing holes 134 is coaxial with the corresponding pivot holes 115, and the first fixing holes 134 and the pivot holes 115 together provide a passage for allowing the pivot 151 to be inserted therein. At each end of each end plate 112, each of the second fixing holes 135 of one reflecting plate 130 is coaxial with a selected one of the through holes 116. The second fixing holes 135 and the selected through hole 116 provide a passage for allowing the corresponding pin 152 to be inserted therein, thus fixing the elongated reflecting plate 130 to the light source holder 110 at a position corresponding to an axis of the selected through hole 116.

Figure 3:
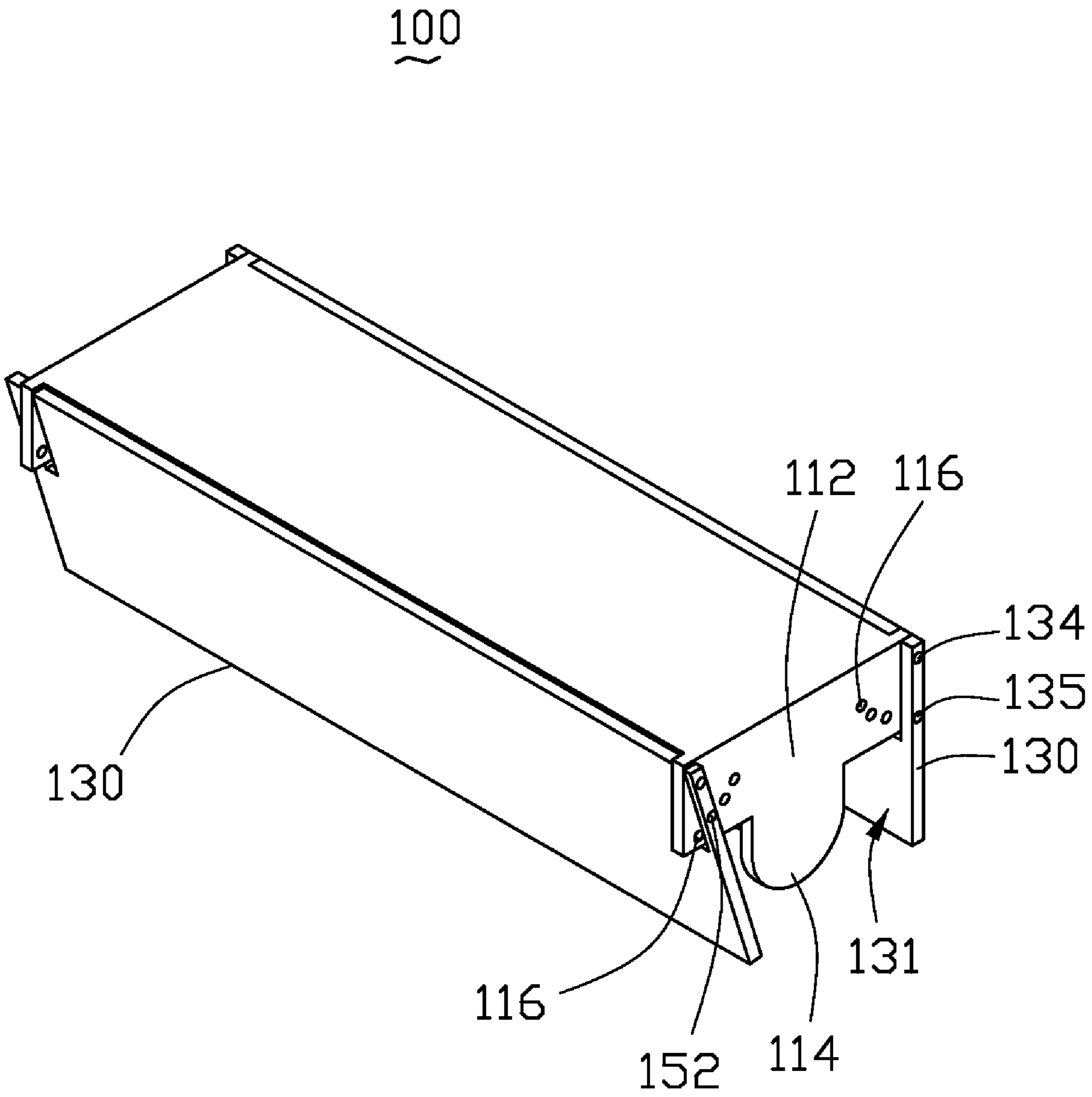
FIG. 3 is a schematic, assembled view showing after rotation of the elongated reflecting plate of the illuminating apparatus in FIG. 2 to a given angle.

The elongated reflecting plates 130 engage with the end plates 112 of the light source holder 110. In detail, each end of each end plate 112 is engaged in a corresponding slit 133 of one of the elongated reflecting plates 130. Each first fixing hole 134 of the elongated reflecting plate 130 communicates with the corresponding pivot hole 115. Thereby, the corresponding pivot 151 is inserted in the first fixing holes 134 and the pivot holes 115 for mounting the elongated reflecting plate 130 to the end plates 112. In such a manner, each of the elongated reflecting plates 130 can rotate about the rotation axis (i.e. a central axis of a corresponding pivot 151 parallel to the lengthwise direction of the linear light source 120) near to or away from the linear light source 120. With reference to FIG. 3, each elongated reflecting plate 130 is pivotably moved to a predetermined attitude according to the reflecting need. Each of the pins 152 extends through and is engaged in the selected through hole 116 and the corresponding second fixing holes 135, thereby fixing the corresponding movable elongated reflecting plate 130 to the light source holder 110 in the desired position. The fixed elongated reflecting plate 130 reflects light emitting from the linear light source 120 to illuminate a predetermined area.

While certain embodiments have been described and exemplified above, various other embodiments from the foregoing disclosure will be apparent to those skilled in the art. The present invention is not limited to the particular embodiments described and exemplified but is capable of considerable variation and modification without departure from the scope of the appended claims.

What is claimed is:

1. An illuminating apparatus, comprising:

a light source holder comprising a base and two opposite end plates extending from two opposite ends of the base;

a linear light source mounted on the light source holder and fixed between the end plates; and two elongated reflecting plates mounted on opposite sides of the light source holder, the elongated reflecting plates each being rotatable about a rotation axis relative to the light source holder;

wherein a length of each of the elongated reflecting plates is greater than that of the base.

2. The illuminating apparatus as claimed in claim 1, wherein the elongated reflecting plates are parallel to the lengthwise direction of the linear light source.

3. The illuminating apparatus as claimed in claim 1, wherein two ends of each of the elongated reflecting plates are pivotably mounted on the two opposite end plates, respectively.

4. The illuminating apparatus as claimed in claim 3, further comprising a pin, wherein at least one of the end plates defines a plurality of through holes therein, one of the elongated reflecting plates defines a fixing hole, and the pin extends through one of the through holes and is engaged in the fixing hole.

5. The illuminating apparatus as claimed in claim 4, wherein the through holes are distributed along an arc of an imaginary circle around the rotation axis of a corresponding elongated reflecting plate.

6. The illuminating apparatus as claimed in claim 1, wherein the rotation axes of the elongated reflecting plates are parallel to the lengthwise direction of the linear light source.

7. The illuminating apparatus as claimed in claim 1, wherein each of the elongated reflecting plates comprises two slits defined at opposite ends thereof, and the slits are perpendicular to the lengthwise direction of the linear light source, and are configured for allowing the end plates to slide therein when the elongated reflecting plate rotates.

8. The illuminating apparatus as claimed in claim 1, wherein the linear light source includes a plurality of light emitting diodes aligned along a line.

9. The illuminating apparatus as claimed in claim 1, further comprising two fixing members, at least one of the end plates defining a plurality of through holes therein, each of the elongated reflecting plates defining a fixing hole, one fixing member extending through one of the through holes of the at least one end plate and being engaged in the fixing hole of one elongated reflecting plate, and the other fixing member extending through another through hole of the at least one end plate and being engaged in the fixing hole of the other elongated reflecting plate.

10. The illuminating apparatus as claimed in claim 9, wherein the fixing members are pins.

11. The illuminating apparatus as claimed in claim 9, wherein the through holes are arranged in two groups at opposite ends of the at least one end plate in the vicinity of ends of the elongated reflecting plates, respectively, and in each group the through holes are distributed along an arc of an imaginary circle around a rotation axis of a corresponding elongated reflecting plate.

12. The illuminating apparatus as claimed in claim 1, wherein the base is substantially rectangular shaped, the end plates are positioned at two opposite sides of the base, and the elongated reflecting plates are mounted at the other two opposite sides of the base.

13. An illuminating apparatus, comprising:

a light source holder comprising a base and two opposite end plates extending from two opposite ends of the base;

a linear light source mounted on the light source holder and fixed between the end plates;

two elongated reflecting plates mounted on opposite sides of the light source holder, the elongated reflecting plates each being rotatable about a rotation axis relative to the light source holder; and a pin;

wherein two ends of each of the elongated reflecting plates are pivotably mounted on the two end plates, respectively, at least one end plate defines a plurality of through holes therein, at least one elongated reflecting plate defines a fixing hole, and the pin extends through one of the through holes and is engaged in the fixing hole.

14. The illuminating apparatus as claimed in claim 13, wherein the elongated reflecting plates are parallel to the lengthwise direction of the linear light source, and the rotation axis of each of the elongated reflecting plates is parallel to the lengthwise direction of the linear light source.

15. The illuminating apparatus as claimed in claim 13, wherein the through holes are distributed along an arc of an imaginary circle around the rotation axis of the at least one elongated reflecting plate.

16. The illuminating apparatus as claimed in claim 13, wherein each of the elongated reflecting plates comprises two slits defined at opposite ends thereof, and each of the slits extends along a direction perpendicular to the lengthwise direction of the linear light source, and is configured for allowing a corresponding end plate to slide therein when the elongated reflecting plate rotates.

17. The illuminating apparatus as claimed in claim 13, wherein the linear light source includes a plurality of light emitting diodes aligned along a line.

18. The illuminating apparatus as claimed in claim 13, wherein the base is substantially rectangular shaped, the ends plates are positioned at two opposite sides of the base, and the elongated reflecting plates are mounted at the other two opposite sides of the base.

19. The illuminating apparatus as claimed in claim 13, further comprising another pin, each of the elongated reflecting plates defining a fixing hole, and each pin extends through a selected one of the through holes and is engaged in the fixing hole of a corresponding elongated reflecting plate.

20. An illuminating apparatus, comprising:

a light source holder comprising a base and two opposite end plates extending from two opposite ends of the base;

a linear light source mounted on the light source holder and fixed between the two end plates;

two elongated reflecting plates mounted on opposite sides of the light source holder, the elongated reflecting plates each being rotatable about a rotation axis relative to the light source holder; and two fixing members;

wherein two ends of each of the elongated reflecting plates are pivotably mounted on the two end plates, respectively, at least one end plate defines a plurality of through holes therein, each of the elongated reflecting plates defines a fixing hole, and each of the fixing members extends through a selected one of the through holes of the at least one end plate and is engaged in the fixing hole of one of the elongated reflecting plates.

* * * * *